United States Patent
Hart et al.

(10) Patent No.: US 11,807,292 B2
(45) Date of Patent: Nov. 7, 2023

(54) BAND TRACK WITH FIBER REINFORCED LIVING HINGES

(71) Applicant: Government of the United States, as represented by the Secretary of the Army, Washington, DC (US)

(72) Inventors: Robert James Hart, Bruce Township, MI (US); Andrew Quintin Smail, Shelby Township, MI (US)

(73) Assignee: Government of the United States, as Represented by the Secretary of the Army, Washington, DC (US)

( * ) Notice: Subject to any disclaimer, the term of this patent is extended or adjusted under 35 U.S.C. 154(b) by 234 days.

(21) Appl. No.: 17/130,416

(22) Filed: Dec. 22, 2020

(65) Prior Publication Data

US 2022/0194498 A1 Jun. 23, 2022

(51) Int. Cl.
| | |
|---|---|
| B62D 55/28 | (2006.01) |
| B62D 55/24 | (2006.01) |
| B33Y 10/00 | (2015.01) |
| B33Y 50/02 | (2015.01) |

(52) U.S. Cl.
CPC ............ *B62D 55/244* (2013.01); *B33Y 10/00* (2014.12); *B33Y 50/02* (2014.12); *B62D 55/28* (2013.01)

(58) Field of Classification Search
CPC ...... B62D 55/244; B62D 55/28; B62D 55/24; B33Y 10/00; B33Y 50/02; B33Y 50/00; B33Y 80/00
See application file for complete search history.

(56) References Cited

U.S. PATENT DOCUMENTS

| | | | | |
|---|---|---|---|---|
| 2,022,567 | A | * 11/1935 | Kegresse | ............... B62D 55/24 305/180 |
| 7,090,312 | B2 | * 8/2006 | Soucy | ................... B62D 55/24 305/173 |
| 7,137,675 | B1 | * 11/2006 | Simula | .................. B62D 55/14 305/137 |
| 7,578,565 | B2 | 8/2009 | Hirose et al. | |
| 9,815,268 | B2 | 11/2017 | Mark et al. | |
| 10,173,410 | B2 | 1/2019 | Nardiello et al. | |

(Continued)

FOREIGN PATENT DOCUMENTS

| | | | | |
|---|---|---|---|---|
| CN | 105128965 | A | 12/2015 | |
| CN | 108561504 | A * | 9/2018 | ............. B29D 29/08 |
| CN | 108561504 | A | 9/2018 | |

OTHER PUBLICATIONS

Mitsuboshi; P12740_catalog—Mitsubishi Timing Belts; Retrieved from www.mblusa.com/assets/1/7/P12740_catalog.pdf; May 6, 2019.

(Continued)

*Primary Examiner* — Lawrence Averick (57) ABSTRACT

A band track including a band having an inner surface, an outer surface, a first side face, and a second side face; a plurality of teeth extending from the inner surface and spaced apart circumferentially around the inner surface; a plurality of lugs extending from the outer surface and each spaced a distance apart circumferentially around the outer surface; a plurality of living hinges defined within the band circumferentially between each of the plurality of teeth; and at least one fiber-reinforcement disposed circumferentially within a neutral plane of the plurality of living hinges and a method of making the same.

14 Claims, 6 Drawing Sheets

(56) References Cited

U.S. PATENT DOCUMENTS

| | | | |
|---|---|---|---|
| 10,392,060 B2* | 8/2019 | Dandurand | B62D 55/07 |
| 2003/0047996 A1* | 3/2003 | Soucy | B62D 55/244 |
| | | | 305/180 |
| 2008/0174176 A1* | 7/2008 | Berg | B62D 55/244 |
| | | | 305/193 |
| 2009/0224598 A1* | 9/2009 | St-Amant | B62D 55/244 |
| | | | 264/258 |
| 2017/0173868 A1 | 6/2017 | Mark | |
| 2017/0197677 A1* | 7/2017 | Dandurand | B62D 55/07 |
| 2019/0217907 A1* | 7/2019 | Rennie | B62D 55/205 |

OTHER PUBLICATIONS

Trojan Tracks; TojanTracks—brochure2018; Retrieved from https://www.trojantracks.com/images/TrojanTracks-brochure2018.pdf; May 6, 2019.

The George Mason University Team; Retrieved from https://seor.vse.gmu.edu/~klaskey/Capstone/MSSEORProjectsSpring18/mowles/index.html; Sep. 10, 2020.

Allegrobotics; Retrieved from http://allegrobotics.com/driveNeedsForAgriculturalRobots.html; Sep. 10, 2020.

* cited by examiner

BAND TRACK WITH FIBER REINFORCED LIVING HINGES

GOVERNMENT INTEREST

The invention described herein may be made, used, or licensed by or for the U.S. Government. The U.S. Government has rights in the invention(s).

TECHNICAL FIELD

The field to which the disclosure generally relates includes band tracks.

BACKGROUND

A robotic system may include a band track.

SUMMARY OF ILLUSTRATIVE VARIATIONS

A number of variations may include a band track comprising a band having an inner surface, an outer surface, a first side surface extending between the inner surface and the outer surface, and a second side surface opposite of the first side surface extending between the inner surface and the outer surface; a plurality of teeth, extending from the inner surface and spaced apart circumferentially around the inner surface, constructed and arranged to engage with a plurality of teeth on a drive wheel; a plurality of lugs extending from the outer surface and each spaced a distance apart circumferentially around the outer surface; a plurality of living hinges defined within the band circumferentially between each of the plurality of teeth; and at least one fiber-reinforcement disposed circumferentially within a neutral plane of the plurality of living hinges.

A number of variations may include a band track segment comprising: a band segment having an inner face, an outer face opposite of the inner face, a first side face extending between the inner face and the outer face, a second side face opposite of the first side face extending between the inner face and the outer face, a first end face extending between the inner face and the outer face perpendicular to the first side face and the second side face, and a second end face opposite of the first end face extending between the inner face and the outer face and perpendicular to the first side face and the second side face, wherein the first end face includes a first mating feature and the second end face includes a second mating feature, and wherein the first mating feature and the second mating feature are constructed and arranged to interlock; a plurality of lugs extending outward from the outer face of the band segment and spaced apart a distance along a width of the outer face; a plurality of teeth, extending from the inner face of the band segment and spaced apart a distance along a width of the inner face, constructed and arranged to engage with a plurality of teeth on a drive wheel; a plurality of living hinges defined within the band segment between each of the plurality of teeth; and at least one fiber reinforcement disposed within a neutral plane of the plurality of living hinges.

A method of making a band track comprising providing a computer with a slicing software; loading a 3D model of at least one band track with fiber reinforced living hinges component into the slicing software; inputting at least one material specification for the at least one band track with fiber reinforced living hinges component into the slicing software; slicing the 3D model into a plurality of stacks of 2D layers and generating a toolpath machine code; providing a 3D printer; transferring the toolpath machine code from the slicing software to the 3D printer; loading the 3D printer with at least one material based on the material specification; initiating printing of the 3D printer; and printing the at least one band track with fiber-reinforced living hinges component.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
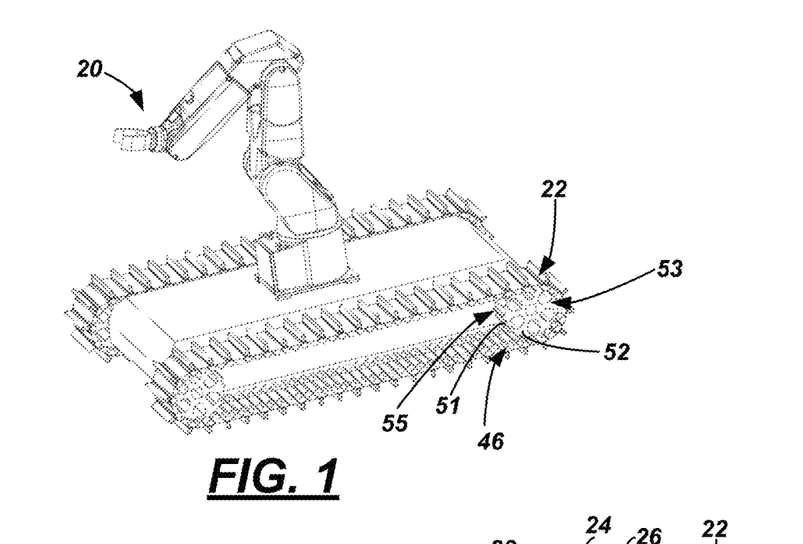
FIG. 1 illustrates a perspective view of a robotic vehicle according to a number of variations.

Referring to FIG. 1, in a number of variations, a robotic vehicle 20 may include one or more tracks 22 which may be operatively attached to one or more drive wheels 52 to drive the robotic vehicle 20. In a number of variations, the use of a band track with fiber-reinforced living hinges 22 may provide for exceptional strength and durability of the band track 22 on rough and uneven terrain, and may extend the life of the band track 22.

Figure 2:
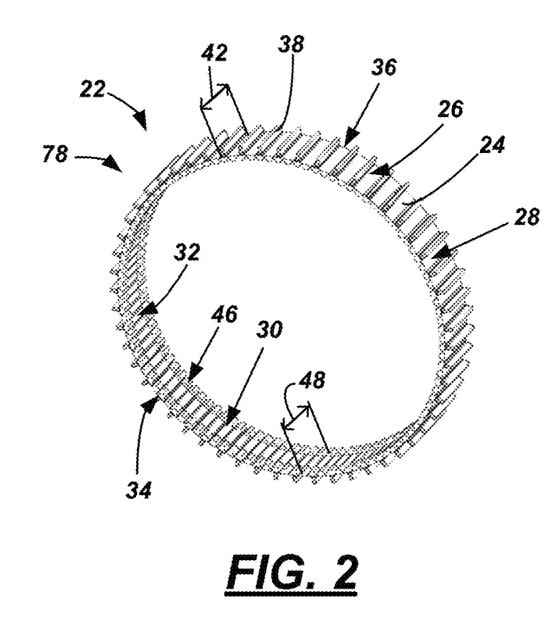
FIG. 2 illustrates a perspective view of a band track according to a number of variations.
Figure 3:
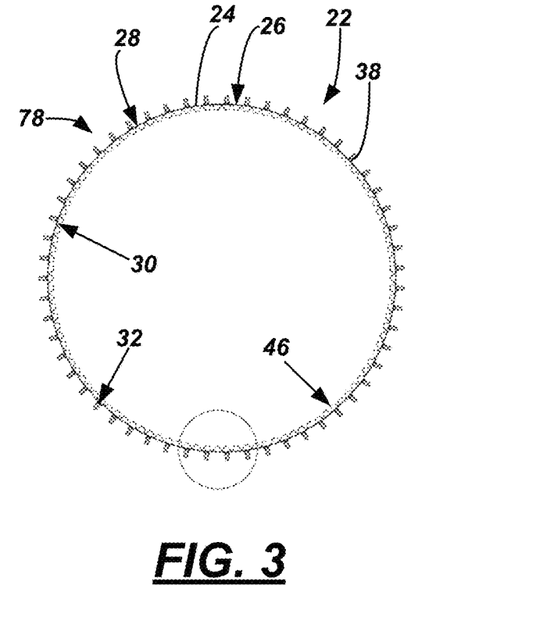
FIG. 3 illustrates a side view of a band track according to a number of variations.

Referring to FIGS. 2-3, in a number of variations, a band track with fiber-reinforced living hinges 22 may comprise a continuous band track with fiber reinforced living hinge design 78 which may include a continuous and unitary band 24 having an outer surface 26 extending along the outer circumference 28 of the band 24, an inner surface 30 extending along an inner circumference 32 of the band 24, a first side surface 34 extending between the inner surface 30 and the outer surface 26, a second side surface 36 opposite of the first side surface 34 and extending between the inner surface 30 and the outer surface 26. In a number of variations, the band 24 may comprise a thermoplastic including, but not limited to, nylon.

Figure 4:
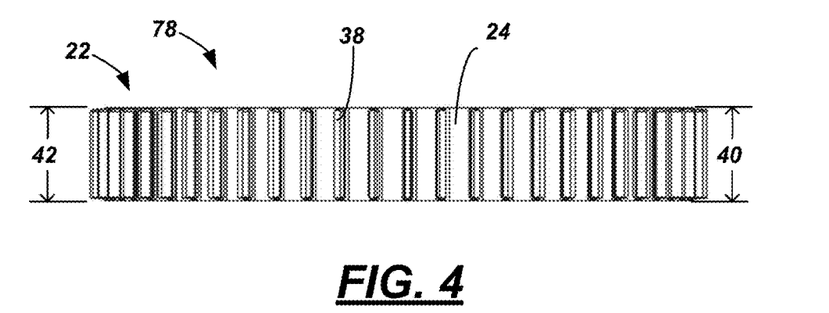
FIG. 4 illustrates a top view of a band track according to a number of variations.
Figure 5:
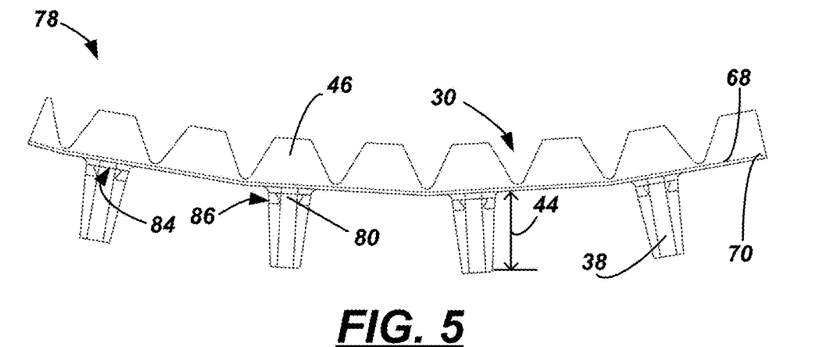
FIG. 5 illustrates a close-up side view of the band track illustrated in FIG. 3 according to a number of variations.
Figure 17:
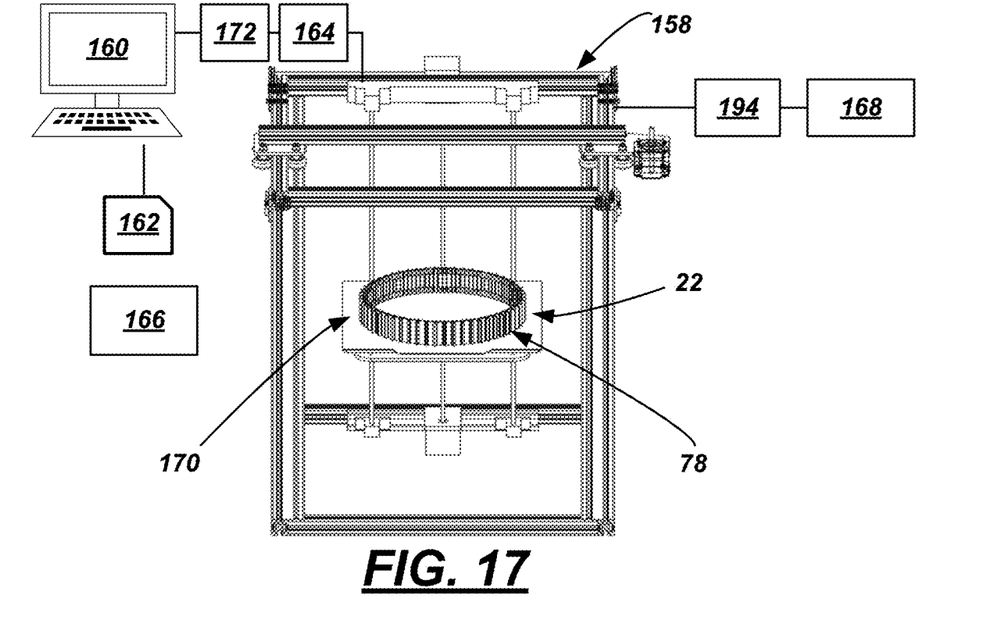
FIG. 17 illustrates a perspective view of a computer and 3D printer system with a printed continuous band track according to a number of variations.

In a number of variations, a plurality of lugs 38 may be spaced apart circumferentially along the outer surface 26 of the band 24 and may extend a distance outward perpendicularly from the outer surface 26. The plurality of lugs 38 may be spaced an equal distance apart, variations of which are illustrated in FIGS. 2 and 3, or may be spaced at varying distances apart (not illustrated), depending on design requirements. Referring to FIG. 4, in a number of variations, the length 40 of each lug 38 may be equal to the length 42 of the band 24. Referring to FIG. 5, in a number of variations, the height 44 of each of the plurality of lugs 38 may be uniform, or may vary (not illustrated) based on design requirements. In a number of variations, the plurality of lugs 38 may comprise a soft thermoplastic including, but not limited to, thermoplastic polyurethane (TPU). In one variation, the plurality of lugs 38 may be continuous and unitary with the band 24, a variation of which is illustrated in FIG. 17.

Figure 6:
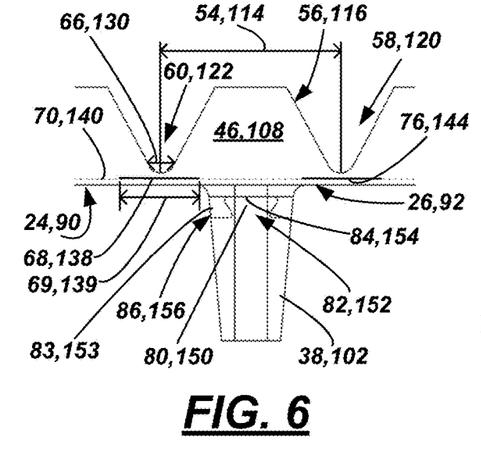
FIG. 6 illustrates a close up-side view of a band track according to a number of variations.

In another variation, the plurality of lugs 38 may be separate components which may be secured to the band 24, variations of which are illustrated in FIGS. 5 & 6. In a number of variations, each of the lugs 38 may include a key 80 defined within a first end 82 of the lug 38, a variation of which is illustrated in FIG. 5. In a number of variations, the outer surface 26 of the band 24 may include a plurality of lug locks 83 spaced apart circumferentially along the outer surface 26 of the band 24 and extending perpendicularly from the outer surface 26. In a number of variations, each of the plurality of lug locks 83 may include a cutout 84 defined within the lug lock 83 constructed and arranged to mate with the key 80 on each of the plurality of lugs 38 to form an interlock connection 86. Any number of mechanical interlock connections may be used including, but not limited to, a dovetail joint, a finger joint, or a mortice and tenon joint. In a number of variations, an adhesive, melting of the material at the connection point, or a mechanical fastener (not illustrated) may also be used in addition to the interlock connection 86 to secure the plurality of lugs 38 to the outer surface 26 of the band 24. In a number of variations, the lug locks 83 may comprise a thermoplastic including, but not limited to, nylon.

Figure 8:
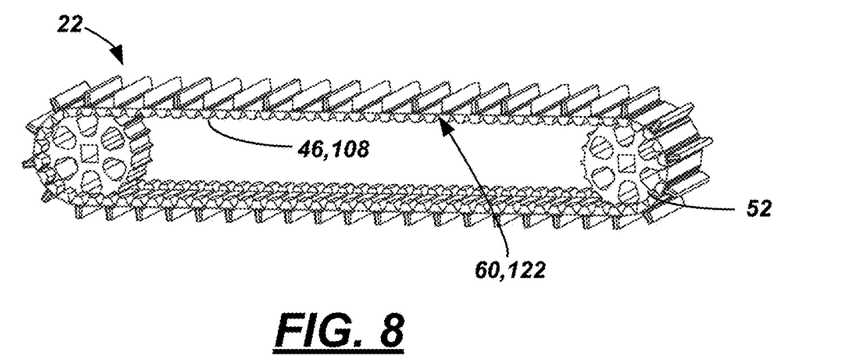
FIG. 8 illustrates a perspective view of a band track operatively connected to drive wheels according to a number of variations.
Figure 9:
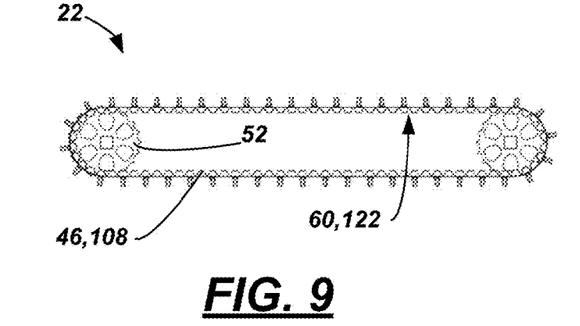
FIG. 9 illustrates a side view of a band track operatively connected to drive wheels according to a number of variations.
Figure 11:
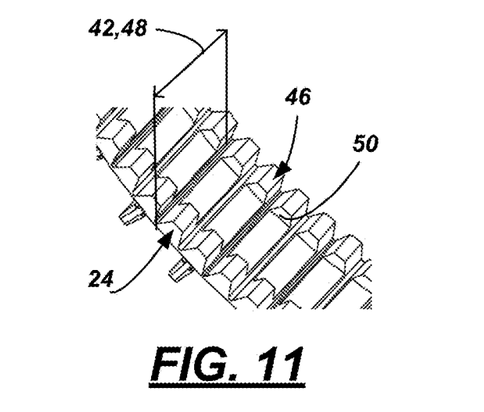
FIG. 11 illustrates a close-up perspective view of a band track according to a number of variations.

In a number of variations, a plurality of teeth 46 may be spaced apart circumferentially along the inner surface 30, variations of which are illustrated in FIGS. 2 and 3. In a number of variations, each of the plurality of teeth 46 may extend a distance perpendicularly from the inner surface 30 and may have a length 48 approximately equal to a length 42 of the band 24, best illustrated in FIG. 2. In a number of variations, the plurality of teeth 46 may be continuous and unitary with the band 24. In a number of variations, each tooth 46 may include a cutout 50 defined within the tooth 46 positioned approximately central of the length 48 of the tooth 46, best illustrated in FIG. 11. In a number of variations, the cutout 50 may be constructed and arranged to accommodate one or more drive wheels 52 such that the remaining portions of the tooth 46 may extend upward along a first and second side 53, 55 of the one or more drive wheels 52, holding the one or more drive wheels 52 in place, variations of which are illustrated in FIGS. 1 and 8. In a number of variations, the plurality of teeth 46 may comprise a thermoplastic including, but not limited to, nylon.

Figure 7:
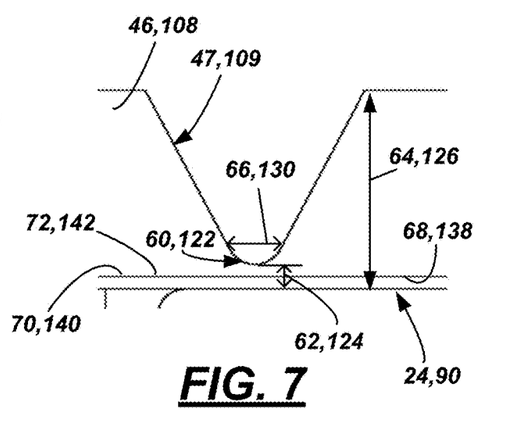
FIG. 7 illustrates a close-up side view of a band track according to a number of variations.
Figure 10:
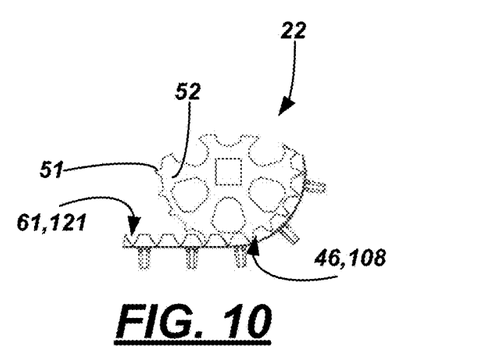
FIG. 10 illustrates a close-up side view of a band track operatively connected to a drive wheel according to a number of variations.

Referring to FIG. 6, in a number of variations, the plurality of teeth 46 may each have a width 54 that tapers 56 as it extends upward which may cause narrowing of the portion 58 of the band 24 between each of the plurality of teeth 46 forming a plurality of living hinges 60, which may allow for flexibility of the band 24. Referring to FIG. 7, in a number of variations, the side surface 47 of each tooth 46 and the surface of the living hinge 60 may define a gap 61. Referring to FIG. 10, in a number of variations, the gaps 61 may each accommodate a tooth 51 of a plurality of teeth 51 on the one or more drive wheels 52 such that the one or more drive wheels 52 may drive the band track with fiber-reinforced living hinges 22. In a number of variations, the plurality of living hinges 60 may allow the band track with fiber-reinforced living hinges 22 to conform to the one or more drive wheels 52. Referring to FIG. 7, in a number of variations, each of the plurality of living hinges 60 may have a thickness 62 less than the height 64 of the plurality of teeth 46. In a number of variations, each of the living hinges 60 may have a 2:1 ratio of width 66 to thickness 62, which may produce up to a 20 degree range of motion at the living hinge 60 without causing a failure in the living hinge 60. In one variation, the thickness 62 of the living hinge 60 may be 0.8-1 mm. In a number of variations, the plurality of living hinges 60 may comprise a thermoplastic including, but not limited to, nylon.

Referring to FIGS. 5-7, in a number of variations, a fiber reinforcement 68 may be positioned circumferentially along the central or neutral plane 70 of the plurality of living hinges 60. In a number of variations, the position of the fiber reinforcement 68 along the central or neutral plane 70 of the living hinges 60 may increase the fatigue crack resistance of the band 24 while not adversely affecting the bending stiffness or flexibility of the living hinge 60. In a number of variations, the fiber reinforcement 68 may comprise multiple bands of continuous fiber reinforcement 72 extending circumferentially along the central or neutral plane 70 of the living hinges 60 and may include a length which is approximately equal to a length 42 of the band 24 (not illustrated). In another variation, referring to FIG. 6, the fiber reinforcement 68 may comprise a plurality of bands of discontinuous fiber 76 aligned circumferentially along the central or neutral plane 70 of the plurality of living hinges 60 positioned at each of the plurality of living hinges 60. In a number of variations, the bands of discontinuous fiber 76 may each have a width 69 which may be approximately twice the width 66 of a living hinge 60. In a number of variations, each of the plurality of bands of discontinuous fiber 76 may extend across approximately the entire length 42 of the band 24 (not illustrated). The fiber reinforcement 68 may comprise any number of long fibers including, but not limited to, aramid, glass, or carbon.

Referring to FIGS. 13-16, in another variation, the band track with fiber reinforced living hinges 22 may comprise several band track segments 88 which may be assembled together to form the band track with fiber-reinforced living hinges 22. In a number of variations, a band track segment 88 may comprise a band segment 90 having an outer face 92, an inner face 94 opposite of the outer face 92, a first side face 93 extending between the outer face 92 and the inner face 94, a second side face 95 opposite of the first side face 93 extending between the outer face 92 and the inner face 94, a first end face 96 extending between the outer face 92 and the inner face 84 and perpendicular to the first side face 93 and the second side face 95, and a second end face 98 opposite of the first end face 96 extending between the outer face 92 and the inner face 84 and perpendicular to the first side face 93 and the second side face 95. In a number of variations, the band segment 90 may comprise a thermoplastic including, but not limited to, nylon.

Figure 13:
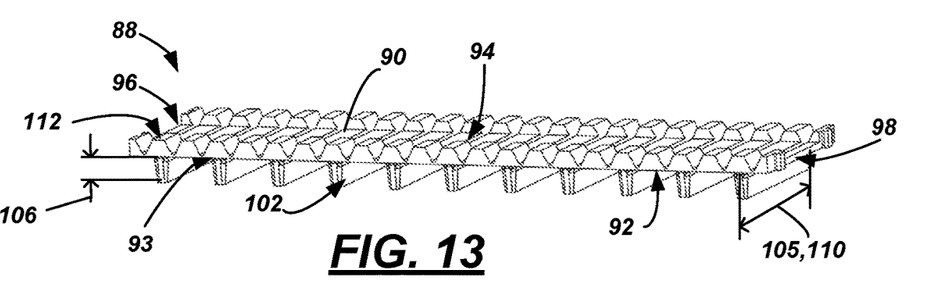
FIG. 13 illustrates a perspective view of a band track segment according to a number of variations.
Figure 15:
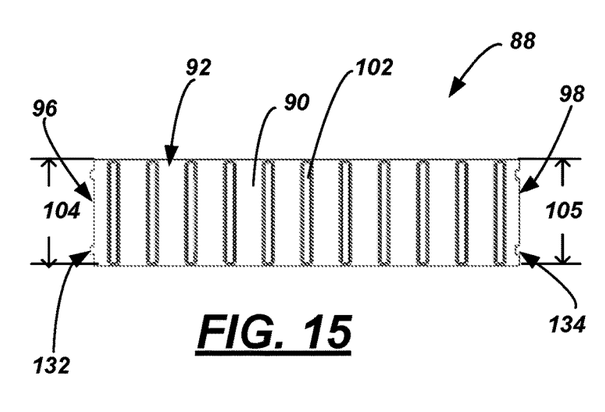
FIG. 15 illustrates a top view of a band track segment according to a number of variations.

Referring to FIGS. 13 and 15, in a number of variations, a plurality of lugs 102 may extend a distance outward perpendicularly from the outer face 92 and may be spaced apart at an approximately equal distance along the width 100 of the outer face 92. Referring to FIG. 15, in a number of variations, the length 104 of the lug 102 may be equal to the length 105 of the band segment 90. In a number of variations, the height 106 of each of the plurality of lugs 102 may be uniform, a variation of which is illustrated in FIG. 13. In a number of variations, the plurality of lugs 102 may comprise a soft thermoplastic including, but not limited to, thermoplastic polyurethane (TPU). In a number of variations, the plurality of lugs 102 may be continuous and unitary with the band segment 90, a variation of which is illustrated in FIG. 13.

Referring to FIG. 6, in another variation, the plurality of lugs 102 may be separate components from the band segment 90 and may be secured to the band segment 90. In a number of variations, the plurality of lugs 102 may each include a key 150 defined within a first end 152 of the lug 102. In a number of variations, a plurality of lug locks 153 may be spaced apart along a width 100 of the band segment 90 and may extend perpendicularly outward from the outer face 92. In a number of variations, each of the plurality of lug locks 153 may include a cutout 154 defined within a surface of the lug lock 153 and may be constructed and arranged to mate with the key 150 on the lug 102 to form an interlock connection 156. Any number of mechanical interlock connections may be used including, but not limited to, a dovetail joint, a finger joint, or a mortice and tenon joint. In a number of variations, an adhesive, melting of the material at the connection point, or a mechanical fastener (not illustrated) may also be used in addition to the interlock connection 156 to secure the plurality of lugs 102 to the outer face 92 of the band segment 90. In a number of variations, the plurality of lug locks 153 may comprise a thermoplastic including, but not limited to, nylon.

Figure 14:
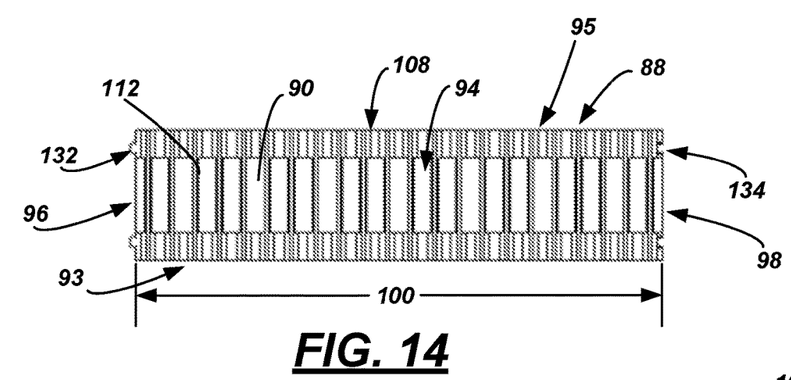
FIG. 14 illustrates a bottom view of a band track segment according to a number of variations.

Referring to FIGS. 13 and 14, in a number of variations, a plurality of teeth 108 may be spaced apart on the inner face 94 along the width 100 of the band segment 90. In a number of variations, each of the plurality of teeth 108 may extend a distance perpendicularly from the inner face 94, best illustrated in FIG. 13. In a number of variations, each of the plurality of teeth 108 may have a length 110 approximately equal to a length 105 of the band segment 90. In a number of variations, each tooth 108 may include a cutout 112 defined within the tooth 108 positioned approximately central of the length 110 of the tooth 108, best illustrated in FIG. 14. In a number of variations, the cutout 112 may be constructed and arranged to accommodate one or more drive wheels 52 such that the remaining portions of the tooth 108 may extend upward along a first and second side 53, 55 of the one or more drive wheels 52, holding the one or more drive wheels 52 in place, variations of which are illustrated in FIGS. 1 and 8. In a number of variations, the plurality of teeth 108 may comprise a thermoplastic including, but not limited to, nylon.

Referring to FIG. 6, in a number of variations, the plurality of teeth 108 may each have a width 114 that tapers 116 as it extends upward which may cause narrowing of the portion 120 of the band segment 90 between each of the plurality of teeth 108 forming a plurality of living hinges 122 defined within the band segment 90, which may allow for flexibility of the band track segment 88. Referring to FIG. 7, in a number of variations, the side surface 109 of each tooth 108 and the surface of the living hinge 60 may define a gap 121. Referring to FIG. 10, in a number of variations, the gaps 121 may each accommodate a tooth 51 of a plurality of teeth 51 on the one or more drive wheels 52 such that when the plurality of band track segments 88 are assembled into a full band track with fiber-reinforced living hinges 22, the one or more drive wheels 52 may drive the band track with fiber-reinforced living hinges 22. In a number of variations, the plurality of living hinges 122 may allow the band track with fiber-reinforced living hinges 22 to conform to the one or more drive wheels 52. Referring again to FIG. 7, in a number of variations, each of the plurality of living hinges 122 may have a thickness 124 less than the height 126 of the plurality of teeth 108. In a number of variations, each of the living hinges 122 may have a 2:1 ratio of width 130 to thickness 124, which may produce up to a 20 degree range of motion at the living hinge 122 without causing a failure in the living hinge 122. In one variation, the thickness 124 of the living hinge 122 may be 0.8-1 mm. In a number of variations, the plurality of living hinges 122 may comprise a thermoplastic including, but not limited to, nylon.

Figure 16:
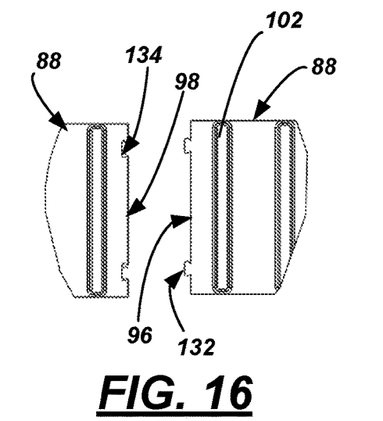
FIG. 16 illustrates a close-up top view of mating sections of band track segments according to a number of variations.

Referring to FIGS. 14-16, in a number of variations, the first end face 96 of the band segment 90 may include a first mating feature 132 defined within a surface of the first end face 96 and the second end face 98 may include a second mating feature 134 defined within a surface of the second end face 98, best illustrated in FIG. 16. In a number of variations, the first mating feature 132 may be constructed and arranged to interlock with the second mating feature 134 to form an interlocking connection to secure the band segments 90 together. Any number of mechanical interlock connections may be used including, but not limited to, a dovetail joint, a finger joint, or a mortice and tenon joint. In a number of variations, an adhesive, melting of the material at the connection point, or a mechanical fastener (not illustrated) may also be used in addition to the interlock connection, or may be used in place of the interlock connection.

Figure 12:
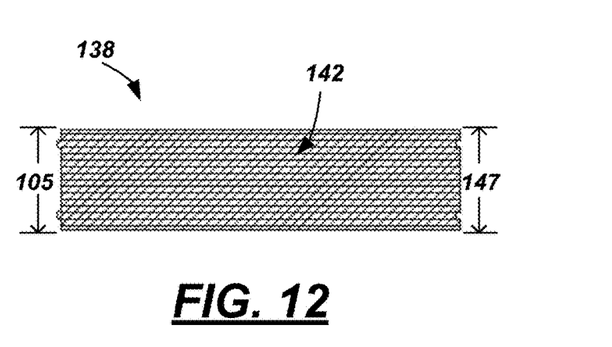
FIG. 12 illustrates a top view of a fiber reinforcement according to a number of variations.

Referring again to FIGS. 6 and 7, in a number of variations, a fiber reinforcement 138 may be positioned along the central or neutral plane 140 of the plurality of living hinges 122. In a number of variations, the position of the fiber reinforcement 138 along the central or neutral plane 140 of the living hinges 122 may increase the fatigue crack resistance of the band segment 90 while not adversely affecting the bending stiffness or flexibility of the living hinge 122. In a number of variations, the fiber reinforcement 138 may comprise multiple bands of continuous fiber reinforcement 142 along the central or neutral plane 140 of the living hinges 122 along the width 100 of the band segment 88, a variation of which is illustrated in FIG. 7, and may include a length 147 which is approximately equal to a length 105 of the band segment 90, a variation of which is illustrated in FIG. 12. In another variation, referring to FIG. 6, the fiber reinforcement 138 may comprise a plurality of bands of discontinuous fiber 144 aligned along the central or neutral plane 140 of the plurality of living hinges 122 positioned at each of the plurality of living hinges 122. In a number of variations, the bands of discontinuous fiber 144 may each have a width 139 which may be approximately twice the width 130 of a living hinge 122. In a number of variations, each of the plurality of bands of discontinuous fiber 144 may extend across approximately the entire length 105 of the band segment 90 (not illustrated). The fiber reinforcement 138 may comprise any number of long fibers including, but not limited to, aramid, glass, or carbon.

Referring to FIGS. 1 and 8, in a number of variations, multiple band track segments 88 may be assembled together by interlocking the first mating feature 132 of each of the band track segments 88 to each of the second mating features 134 to form the completed band track with fiber-reinforced living hinges 22.

In a number of variations, the band track with fiber-reinforced living hinges 22 may have increased flexibility from the plurality of living hinges 60, 122 over a linked track system (not illustrated) while having increased stiffness and fatigue resistance from the use of the fiber reinforcement(s) 68, 138 over a rubber track (not illustrated).

Figure 18:
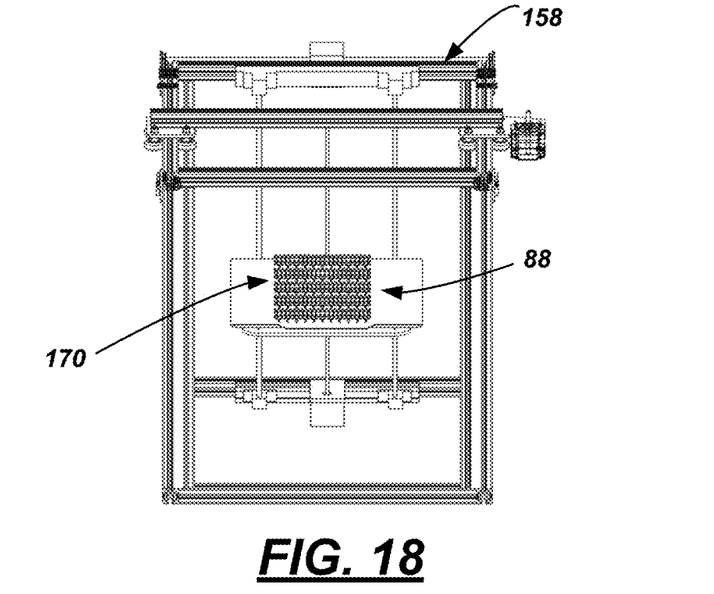
FIG. 18 illustrates a perspective view of a 3D printer with printed band track segments according to a number of variations.

Referring to FIGS. 17-18, in a number of variations, a band track with fiber-reinforced living hinges 22 may be manufactured using a 3D printer 158. Referring to FIG. 17, a computer 160 having a slicing software 162 may be used to generate a machine tool path code 164 for the 3D printer 158 to print at least one band track with fiber reinforced living hinges component 170. A 3D model 166 of any of the band-track with fiber reinforced living hinges 22 designs discussed above including, but not limited to, the continuous band track with fiber reinforced living hinge 78 design or the band track with fiber reinforced living hinge segment 88 design, may be loaded into the slicing software 162.

In a number of variations, an operator (not illustrated) may specify which portions of the 3D model 166 are to be printed from which material 168. In a number of variations, the material 168 used for the band track with fiber-reinforced living hinges component 170 may include at least one of: a thermoplastic including, but not limited to, nylon, for the band 24 or band segment 90, the plurality of living hinges 60, 122, the plurality of teeth 46, 108, and the plurality of lug locks 83, 153 (if required); long fiber including, but not limited to, aramid, carbon, and glass, for the fiber-reinforcement 68, 138; and a soft thermoplastic including, but not limited, a thermoplastic polyurethane, for the plurality of lugs 38, 102. An operator may also specify the use of a support material (not illustrated). A support material may be used to support areas of a component 170 that may be suspended in air, which may later be removed from the component 170 and discarded. In one variation, the support material may comprise a thermoplastic.

In a number of variations, the operator may use the slicing software 162 to "slice" the model into stacks of 2D layers 172 and generate a toolpath machine code 164, also known as "gcode." In a number of variations, the toolpath machine code 164 generated by the slicing software 162 may be transferred to the operating system 194 of the 3D printer 158 wirelessly or by direct connection.

In a number of variations, the materials 168 to be used for printing may be loaded into the 3D printer 158. In a number of variations, printing may be initiated in any number of variations including, but not limited to, sending a print command to the 3D printer 158 by clicking "PRINT." In a number of variations, the 3D printer 158 may start printing one or more components 170 based off the 3D model 166. The 3D printer 158, in a number of variations, may print the one or more components 170 layer by layer using the materials 168 specified in the tool path machine code 164.

Referring to FIG. 17, in a number of variations, for the continuous band track with fiber reinforced living hinges design 78 (with or without the plurality of lugs 38) the 3D printer 158 may begin printing the component 170 starting with the first side surface 34 of the band 24 and circumferentially printing the materials 168 layer by layer building up to the second side surface 36. In one variation, each printing layer may comprise up to four different materials such that the plurality of lugs 38 may comprise a soft thermoplastic including, but not limited to, thermoplastic polyurethane; the fiber reinforcement 68 may comprise a long fiber including, but not limited to, aramid, glass, or carbon; the band 24 including the plurality of living hinges 60, the plurality of teeth 46, the plurality of lug locks 83 (if the plurality of lugs 38 are separately printed), and the support material (if needed) may comprise a thermoplastic including, but not limited to, nylon; and the support material (if needed) may alternately comprise a thermoplastic other than nylon which may make removal of the support material from the printed component easier. In a number of variations, where the plurality of lugs 102 are printed separately, the 3D printer 158 may be programmed to separately print the plurality of lugs 102 using a soft thermoplastic.

Referring to FIG. 18, in a number of variations, 3D printing of a band track with fiber-reinforced living hinges segments 88 may begin by printing the plurality of lugs 38 using a soft thermoplastic, or, where the plurality of lugs 38 are printed separately, the lug locks 153, using a thermoplastic. In a number of variations, if needed, support material (not illustrated) may also be printed using a thermoplastic. In a number of variations, printing of the band segment 90 may next be started using a thermoplastic. In a number of variations, the 3D printer 158 may then use the fiber material to print a layer of the fiber-reinforcement 138 continuously at the neutral plane 140 of each of the plurality of living hinges 122 or the 3D printer 158 may print a layer alternating between the fiber material and the thermoplastic such that the fiber reinforcement 138 is printed discontinuously at the neutral plane 140 of the plurality of living hinges 122 at each of the plurality of living hinges 122. In a number of variations, the 3D printer 158 may continue printing layers of thermoplastic on the band segment 90 to create the plurality of living hinges 122 and the plurality of teeth 108. In a number of variations, where the plurality of lugs 102 are printed separately, the 3D printer 158 may then be programmed to separately print the plurality of lugs 102 using a soft thermoplastic.

In a number of variations, the component(s) 170 may be removed from the 3D printer 158 upon completion of printing. In a number of variations, the support material (if used) may then be removed from the component 170. If the band track with fiber-reinforced living hinges 22 is printed as segments 88 and/or with the plurality of lugs 38, 102 printed separately, the components 170 may then be assembled together to form the band track with fiber-reinforced living hinges 22, as discussed above.

Figure 19:
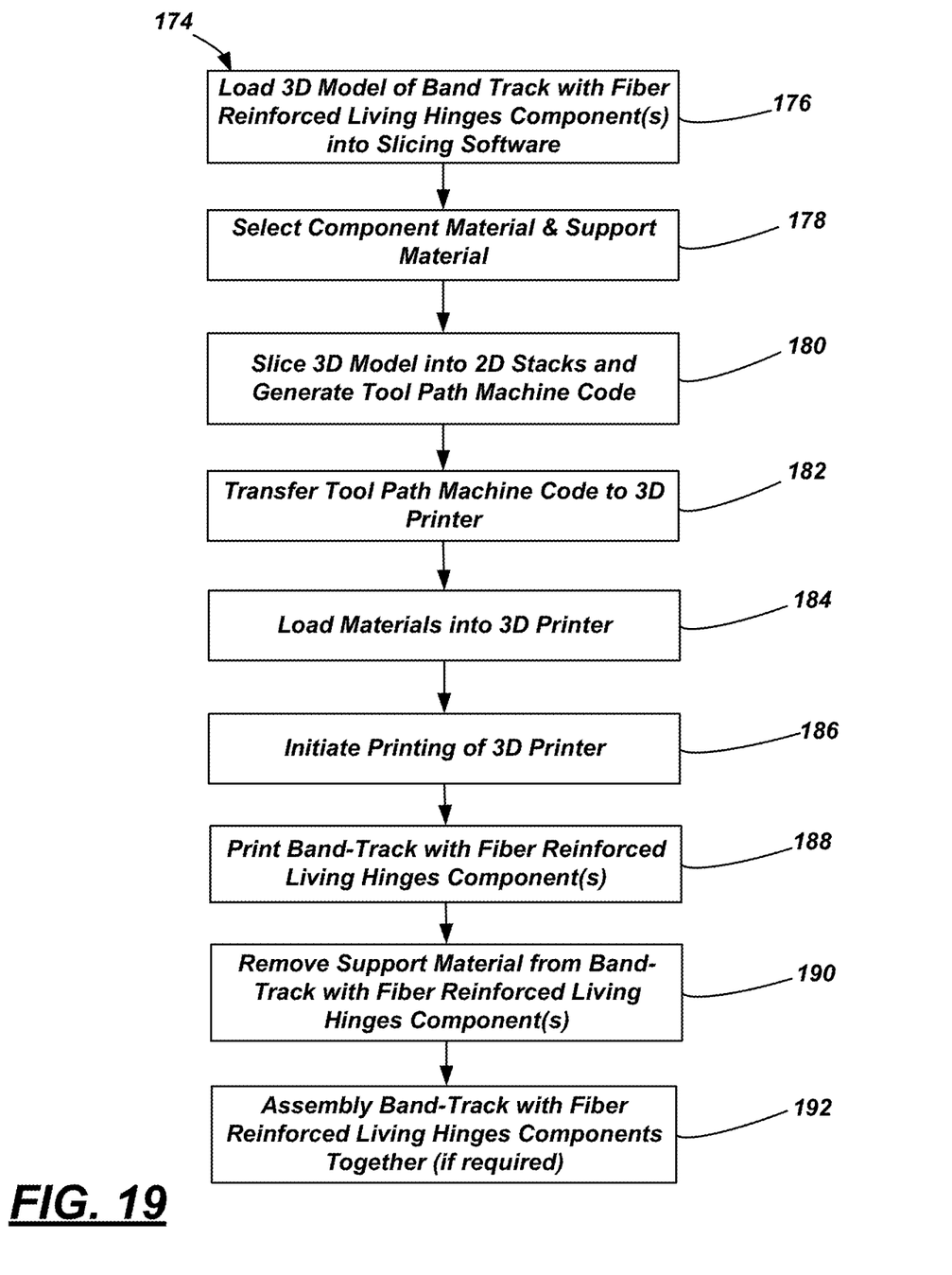
FIG. 19 illustrates a method of manufacturing a band track according to a number of variations.

FIG. 19 illustrates a method 174 for making a band track with fiber-reinforced living hinges 22 using a 3D printer 158. In a number of variations, a method 174 for making a band track with fiber-reinforced living hinges 22 using a 3D printer 158 may comprise a first step 176 including loading a 3D model 166 into a slicing software 162 on a computer 160 via an operator (not illustrated). In a number of variations, a second step 178 may include the operator specifying the material 168 of each portion of the 3D model 166 and specifying the use of support material, if needed. In a number of variations, a third step 180 may include an operator using the slicing software 162 to "slice" the 3D model 166 into a plurality of 2D layers 172 and generating a tool path machine code 164. In a number of variations, a fourth step 182 may include an operator transferring the tool path machine code 164 from the slicing software 162 to the operating system 194 of the 3D printer 158. In a number of variations, a fifth step 184 may include loading material 168 into the 3D printer 158. In a number of variations, a sixth step 186 may include initiating printing of the 3D printer 158 including, but not limited to, pressing or clicking a "PRINT" command (not illustrated) for the 3D printer 158. In a number of variations, a seventh step 188 may include printing of the 3D model component(s) 170. In a number of variations, an eighth step 190 may include removing the component(s) 170 from the 3D printer 158 and removing any support material from the component(s) 170. In a number of variations, where multiple components 170 are printed, a ninth step 192 of assembling the components 170 together may be required in order to create the finished band track with fiber-reinforced living hinges 22.

In one variation, the ninth step 192 may include interlocking 86 the key 80 on each of the plurality of lugs 38 to each of the lug locks 83 on the outer face 26 of the band 24. In a number of variations, the plurality of lugs 38 may be further secured to the band 24 via one or more adhesives and/or melting of the material around the key 80 and lug lock 83 interlock connection 86.

In another variation, the ninth step 192 may include assembly of the band track with fiber-reinforced living hinges segments 88 together by interlocking the first and second mating features 132, 134 together. The first and second mating features 132, 134 may be further secured together via one or more adhesives or by melting of the material in the interlocking area.

In another variation, the ninth step 192 may include assembling a plurality of lugs 102 onto each of the band segments 90. In a number of variations, the key 150 on each of the plurality of lugs 102 may be interlocked with each of the plurality of lug locks 153 on the outer face 92 of the band segment 90. In a number of variations, the plurality of lugs 102 may be further secured to the band segment 90 via one or more adhesives and/or melting of the material around the key 150 and the lug lock 153 interlock connection 156. In a number of variations, the band track with fiber-reinforced living hinges segments 88 may then be connected together by interlocking the first and second mating feature 132, 134 together. The first and second mating feature 132, 134 may be further secured together via one or more adhesives or by melting of the material in the interlocking area.

In the defense industry, using a 3D printer 158 to manufacture the band track with fiber-reinforced living hinges 22 may allow soldiers to produce on demand parts in the field, reducing the burden of transporting a stock pile of spare parts. Further, printing of the band track with fiber-reinforced living hinges 22 as segments 88 to be assembled together after printing may allow for a larger track band with fiber reinforced living hinges 22 to be produced on a smaller printer. The use of a smaller printer may be beneficial in the field as it may not require as much space and may also reduce weight for ease of transportation.

It is noted that a robotic vehicle 20 having a band track with a fiber-reinforced living hinges 22 for use in the defense industry is discussed above for illustrative purposes, however, the band track with fiber-reinforced living hinges 22 may be used on any number of robotic vehicle applications including, but not limited to, agricultural, recreational, emergency response, and construction.

The following description of variants is only illustrative of components, elements, acts, products, and methods considered to be within the scope of the invention and are in no way intended to limit such scope by what is specifically disclosed or not expressly set forth. The components, elements, acts, product, and methods as described herein may be combined and rearranged other than as expressly described herein and still are considered to be within the scope of the invention.

Variation 1 may include a band track comprising: a band having an inner surface, an outer surface, a first side surface extending between the inner surface and the outer surface, and a second side surface opposite of the first side surface extending between the inner surface and the outer surface; a plurality of teeth, extending from the inner surface and spaced apart circumferentially around the inner surface, constructed and arranged to engage with a plurality of teeth on a drive wheel; a plurality of lugs extending from the outer surface and each spaced a distance apart circumferentially around the outer surface; a plurality of living hinges defined within the band circumferentially between each of the plurality of teeth; and at least one fiber-reinforcement disposed circumferentially within a neutral plane of the plurality of living hinges.

Variation 2 may include a band track as set forth in Variation 1, wherein a width of each of the plurality of living hinges is at least twice a distance of a thickness of each of the plurality of living hinges.

Variation 3 may include a band track as set forth in Variation 2, wherein the thickness of each of the plurality of living hinges is in a range of 0.8 mm-1 mm.

Variation 4 may include a band track as set forth in any of Variations 1-3, wherein each tooth of the plurality of teeth include a cutout defined within the tooth constructed and arranged to accommodate a drive wheel.

Variation 5 may include a band track as set forth in any of Variations 1-4, wherein the band, the plurality of teeth, and the plurality of living hinges comprise a thermoplastic; the fiber-reinforcement comprises a long fiber; and the plurality of lugs comprise a soft thermoplastic.

Variation 6 may include a band track as set forth in any of Variations 1-5, wherein the at least one fiber reinforcement comprises one of a plurality of continuous long fibers which extend circumferentially around an entire circumference of the neutral plane of the plurality of living hinges or a plurality of discontinuous aligned fiber reinforcements positioned circumferentially at each of the plurality of living hinges.

Variation 7 may include a band track as set forth in any of Variations 1-6, wherein the band track is a single unitary and continuous component.

Variation 8 may include a band track as set forth in any of Variations 1-7, wherein the outer surface of the band further comprises a plurality of lug locks, spaced circumferentially around the outer surface of the band, each including a cutout defined within the lug lock, and wherein a first end of each lug of the plurality of lugs includes a key, and wherein the key on each of the plurality of lugs is interlocked with the cutout defined within each of the plurality of lug locks.

Variation 9 may include a band track as set forth in any of Variations 1-8, wherein the band track is made via a 3D printer.

Variation 10 may include a band track segment comprising: a band segment having an inner face, an outer face opposite of the inner face, a first side face extending between the inner face and the outer face, a second side face opposite of the first side face extending between the inner face and the outer face, a first end face extending between the inner face and the outer face perpendicular to the first side face and the second side face, and a second end face opposite of the first end face extending between the inner face and the outer face and perpendicular to the first side face and the second side face, wherein the first end face includes a first mating feature and the second end face includes a second mating feature, and wherein the first mating feature and the second mating feature are constructed and arranged to interlock; a plurality of lugs extending outward from the outer face of the band segment and spaced apart a distance along a width of the outer face; a plurality of teeth, extending from the inner face of the band segment and spaced apart a distance along a width of the inner face, constructed and arranged to engage with a plurality of teeth on a drive wheel; a plurality of living hinges defined within the band segment between each of the plurality of teeth; and at least one fiber reinforcement disposed within a neutral plane of the plurality of living hinges.

Variation 11 may include a band track segment as set forth in Variation 10, wherein a width of each of the plurality of living hinges is at least twice a distance of a thickness of each of the plurality of living hinges.

Variation 12 may include a band track as set forth in any of Variations 10-11, wherein the band segment, the plurality of teeth, and the plurality of living hinges comprise a thermoplastic; the fiber-reinforcement comprises a long fiber; and the plurality of lugs comprise a soft thermoplastic.

Variation 13 may include a band track segment as set forth in any of Variations 10-12, wherein the at least one fiber reinforcement comprises one of a plurality of continuous long fibers which extend across an entire width of the band segment or a plurality of discontinuous aligned fiber reinforcements positioned at each of the plurality of living hinges.

Variation 14 may include a band track segment as set forth in any of Variations 10-13, wherein the outer face further includes a plurality of lug locks, spaced apart along the width of the band, each including a cutout defined within the lug lock, and wherein a first end of each of the plurality of lugs includes a key, and wherein each of the plurality of keys are interlocked within the cutout defined within each of the plurality of lug locks.

Variation 15 may include a band track segment as set forth in any of Variations 10-14, wherein the band track segment is made via a 3D printer.

Variation 16 may include a method of making a band track comprising: providing a computer with a slicing software; loading a 3D model of at least one band track with fiber reinforced living hinges component into the slicing software; inputting at least one material specification for the at least one band track with fiber reinforced living hinges component into the slicing software; slicing the 3D model into a plurality of stacks of 2D layers and generating a toolpath machine code; providing a 3D printer; transferring the toolpath machine code from the slicing software to the 3D printer; loading the 3D printer with at least one material based on the material specification; initiating printing of the 3D printer; and printing the at least one band track with fiber-reinforced living hinges component.

Variation 17 may include a method of making a band track as set forth in Variation 16, wherein the at least one band track with fiber-reinforced living hinges component comprises a band having an inner surface and an outer surface, a first side surface extending between the inner surface and the outer surface, a second side surface opposite of the first side surface extending between the inner surface and the outer surface, a plurality of teeth extending from the inner surface and each spaced a distance circumferentially around the inner surface, a plurality of lugs extending from the outer surface and each spaced a distance apart circumferentially around the outer surface, a plurality of living hinges defined within the band circumferentially between each of the plurality of teeth, and at least one fiber-reinforcement disposed circumferentially within a neutral plane of the plurality of living hinges; and wherein the at least one material specification includes thermoplastic for the band, the plurality of teeth, and the plurality of living hinges; long fiber for the fiber reinforcement; and a soft thermoplastic for the plurality of lugs.

Variation 18 may include a method of making a band track as set forth in Variation 16, wherein the at least one band track with fiber-reinforced living hinges component includes a first band track with fiber-reinforced living hinges component comprising a band having an inner surface and an outer surface, a first side surface extending between the inner surface and the outer surface, a second side surface opposite of the first side surface extending between the inner surface and the outer surface, a plurality of teeth extending from the inner surface and spaced apart circumferentially around the inner surface, a plurality of lug locks spaced circumferentially around the outer surface, a plurality of living hinges defined within the band circumferentially between each of the plurality of teeth, and at least one fiber-reinforcement disposed circumferentially within a neutral plane of the plurality of living hinges; and a plurality of second band track with fiber-reinforced living hinges components comprising a lug having a key; wherein the at least one material specification comprises a thermoplastic for the band, the plurality of teeth, the plurality of lug locks, and the plurality of living hinges; a long fiber for the at least one fiber-reinforcement; and a soft thermoplastic for the plurality of lugs; and further comprising: interlocking the key on each of the plurality of lugs into each of the plurality of lug locks on the outer surface to form a band track with fiber-reinforced living hinges.

Variation 19 may include a method of making a band track as set forth in Variation 16, wherein the at least one band track with fiber-reinforced living hinges component comprises a plurality of band segments each having an inner face, an outer face opposite of the inner face, a first side face extending between the inner face and the outer face, a second side face opposite of the first side face extending between the inner face and the outer face, a first end face extending between the inner face and the outer face perpendicular to the first side face and the second side face, and a second end face opposite of the first end face extending between the inner face and the outer face and perpendicular to the first side face and the second side face, wherein the first end face includes a first mating feature and the second end face includes a second mating feature; wherein the at least one material specification comprises a thermoplastic for the band, the plurality of teeth, and the plurality of living hinges; a long fiber for the fiber reinforcement; and a soft thermoplastic for the plurality of lugs; and further comprising: interlocking the plurality of band segments together to form a band track with fiber-reinforced living hinges.

Variation 20 may include a method of making a band track as set forth in Variation 16, wherein the at least one band track with fiber-reinforced living hinges component includes a plurality of first band track with fiber-reinforced living hinges components each comprising a band segment having an outer face, an inner face opposite of the outer face, a first side face extending between the inner face and the outer face, a second side face opposite of the first side face extending between the inner face and the outer face, a first end face, and a second end face opposite of the first end face, wherein the first end face includes a first mating feature and the second end face includes a second mating feature, a plurality of lug locks extending from the outer face of the band segment and spaced a distance along a width of the outer face, a plurality of teeth extending from the inner face of the band segment and spaced apart a distance along a width of the inner face, a plurality of living hinges defined within the band segment between each of the plurality of teeth, and at least one fiber reinforcement disposed within a neutral plane of the plurality of living hinges; and a plurality of second band track with fiber-reinforced living hinges components comprising a lug having a key; wherein the at least one material specification comprises a thermoplastic for the band, the plurality of teeth, the plurality of lug locks, and the plurality of living hinges; a long fiber for the fiber reinforcement; and a soft thermoplastic for the plurality of lugs; and further comprising: interlocking the key on each of the plurality of lugs with each of the plurality of lug locks; and interlocking the first mating feature with the second mating feature on each of the plurality of band segments to form a band track with fiber-reinforced living hinges.

The above description of select variations within the scope of the invention is merely illustrative in nature and, thus, variations or variants thereof are not to be regarded as a departure from the spirit and scope of the invention.

What is claimed is:

1. A band track comprising:
   a band having an inner surface, an outer surface, a first side surface extending between the inner surface and the outer surface, and a second side surface opposite of the first side surface extending between the inner surface and the outer surface;
   a plurality of teeth, extending from the inner surface and spaced apart circumferentially around the inner surface, constructed and arranged to engage with a plurality of teeth on a drive wheel;
   a plurality of lugs extending from the outer surface and each spaced a distance apart circumferentially around the outer surface;
   a plurality of living hinges defined within the band circumferentially between each of the plurality of teeth;
   at least one fiber-reinforcement disposed circumferentially within a neutral plane of the plurality of living hinges; and
   wherein each of the plurality of teeth have a width that tapers as it extends outward causing narrowing of a portion of the band between each tooth, forming a single hinge point defined within the band between each tooth such that flexibility at each hinge point in the band track is uniform throughout an entire length of the band.

2. The band track of claim 1, wherein a width of each of the plurality of living hinges is at least twice a distance of a thickness of each of the plurality of living hinges.

3. The band track of claim 2, wherein the thickness of each of the plurality of living hinges is in a range of 0.8 mm-1 mm.

4. The band track of claim 1, wherein the band, the plurality of teeth, and the plurality of living hinges comprise a thermoplastic; the fiber-reinforcement comprises a long fiber; and the plurality of lugs comprise a soft thermoplastic.

5. The band track of claim 1, wherein the at least one fiber reinforcement comprises one of a plurality of continuous long fibers which extend circumferentially around an entire circumference of the neutral plane of the plurality of living hinges or a plurality of discontinuous aligned fiber reinforcements positioned circumferentially at each of the plurality of living hinges.

6. The band track of claim 1, wherein the band track is a single unitary and continuous component.

7. The band track of claim 1, wherein the outer surface of the band further comprises a plurality of lug locks, spaced circumferentially around the outer surface of the band, each including a cutout defined within the lug lock, and wherein a first end of each lug of the plurality of lugs includes a key, and wherein the key on each of the plurality of lugs is interlocked with the cutout defined within each of the plurality of lug locks.

8. The band track of claim 1, wherein the band track is made via a 3D printer.

9. A band track segment comprising:
   a band segment having an inner face, an outer face opposite of the inner face, a first side face extending between the inner face and the outer face, a second side face opposite of the first side face extending between the inner face and the outer face, a first end face extending between the inner face and the outer face perpendicular to the first side face and the second side face, and a second end face opposite of the first end face extending between the inner face and the outer face and perpendicular to the first side face and the second side face, wherein the first end face includes a first mating feature and the second end face includes a second mating feature, and wherein the first mating feature and the second mating feature are constructed and arranged to interlock;
   a plurality of lugs extending outward from the outer face of the band segment and spaced apart a distance along a width of the outer face;
   a plurality of teeth, extending from the inner face of the band segment and spaced apart a distance along a width of the inner face, constructed and arranged to engage with a plurality of teeth on a drive wheel;
   a plurality of living hinges defined within the band segment between each of the plurality of teeth; and
   at least one fiber reinforcement disposed within a neutral plane of the plurality of living hinges.

10. The band track segment of claim 9, wherein a width of each of the plurality of living hinges is at least twice a distance of a thickness of each of the plurality of living hinges.

11. The band track segment of claim 9, wherein the band segment, the plurality of teeth, and the plurality of living hinges comprise a thermoplastic; the fiber-reinforcement comprises a long fiber; and the plurality of lugs comprise a soft thermoplastic.

12. The band track segment of claim 9, wherein the at least one fiber reinforcement comprises one of a plurality of continuous long fibers which extend across an entire width of the band segment or a plurality of discontinuous aligned fiber reinforcements positioned at each of the plurality of living hinges.

13. The band track segment of claim 9, wherein the outer face further includes a plurality of lug locks, spaced apart along the width of the band, each including a cutout defined within the lug lock, and wherein a first end of each of the plurality of lugs includes a key, and wherein each of the plurality of keys are interlocked within the cutout defined within each of the plurality of lug locks.

14. The band track segment of claim 9, wherein the band track segment is made via a 3D printer.

\* \* \* \* \*